US009576428B2

(12) United States Patent
Argue et al.

(10) Patent No.: US 9,576,428 B2
(45) Date of Patent: Feb. 21, 2017

(54) INTEGRATED LOYALTY PROGRAM AND GAME MECHANIC

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 259 days.

(21) Appl. No.: 14/473,797

(22) Filed: Aug. 29, 2014

(65) Prior Publication Data

US 2016/0063816 A1 Mar. 3, 2016

(51) Int. Cl.
*G06F 17/00* (2006.01)
*G07F 17/32* (2006.01)

(52) U.S. Cl.
CPC .................................. *G07F 17/3255* (2013.01)

(58) Field of Classification Search
USPC ...................................................... 463/16–25
See application file for complete search history.

(56) References Cited

U.S. PATENT DOCUMENTS 4,723,212 A 2/1988 Mindrum
4,817,949 A 4/1989 Bachman
5,025,372 A 6/1991 Burton
6,251,017 B1 6/2001 Leason
6,321,210 B1 11/2001 O'Brien
7,841,932 B2 11/2010 Sadri
8,408,455 B1 4/2013 Taylor
8,554,631 B1 * 10/2013 Barton .................. G06Q 20/20 705/16
2003/0083933 A1 5/2003 McAlear
2004/0242308 A1 12/2004 Gray
2005/0023346 A1 2/2005 Bakker
2006/0277100 A1 12/2006 Parham
2010/0211449 A1 8/2010 Nelson
2011/0125561 A1 5/2011 Marcus
2011/0178861 A1 7/2011 Georgi
2013/0054412 A1 * 2/2013 Brendell ................ G06Q 20/12 705/26.41
2013/0103481 A1 4/2013 Carpenter
2013/0191213 A1 * 7/2013 Beck .................. G06Q 30/0267 705/14.53

* cited by examiner

*Primary Examiner* — Ronald Laneau
(74) *Attorney, Agent, or Firm* — Howard & Howard Attorneys PLLC

(57) ABSTRACT

The present invention extends to methods, systems, and computer program products for an integrated loyalty program and game mechanic. When a customer makes a purchase of physical products from a merchant, membership in the merchant's loyalty program can be rewarded with a digital (virtual) asset for use in a computer game. The merchant can also advertise digital assets as loyalty program rewards in the game to persuade customers to purchase physical products from the merchant. In one aspect, the game is maintained by the merchant. In another aspect, the merchant enters into a partnership with an owner of a third party game.

20 Claims, 3 Drawing Sheets

INTEGRATED LOYALTY PROGRAM AND GAME MECHANIC

CROSS-REFERENCE TO RELATED APPLICATIONS

Not applicable.

BACKGROUND

1. Field of the Invention

This invention relates generally to the field of retail loyalty programs, and, more particularly, to integrating a loyalty program with a game mechanic.

2. Related Art

Loyalty programs or award based programs encourage consumer behavior toward making purchases and further patronizing particular businesses. For example, a card that is similar to a plastic credit card typically has a barcode or magnetic stripe that is scanned to identify the cardholder as a member of a loyalty program. Other identifying information may also be used for identification, such as the cardholder's phone number. By presenting the card or other identifying information, a purchaser can be entitled to a reward. Rewards can include, for example, a discount, a credit, a recommendation, a loyalty based point, a referral, a promotion, a product, a service, etc.

However, under the rules of a merchant's loyalty program, some purchases may not qualify for a reward. When customers do not receive a reward as the result of a purchase, they may become less interested in the loyalty program and ultimately purchase fewer products from the merchant.

BRIEF DESCRIPTION OF THE DRAWINGS

The specific features, aspects and advantages of the present invention will become better understood with regard to the following description and accompanying drawings where.

DETAILED DESCRIPTION

Figure 1:
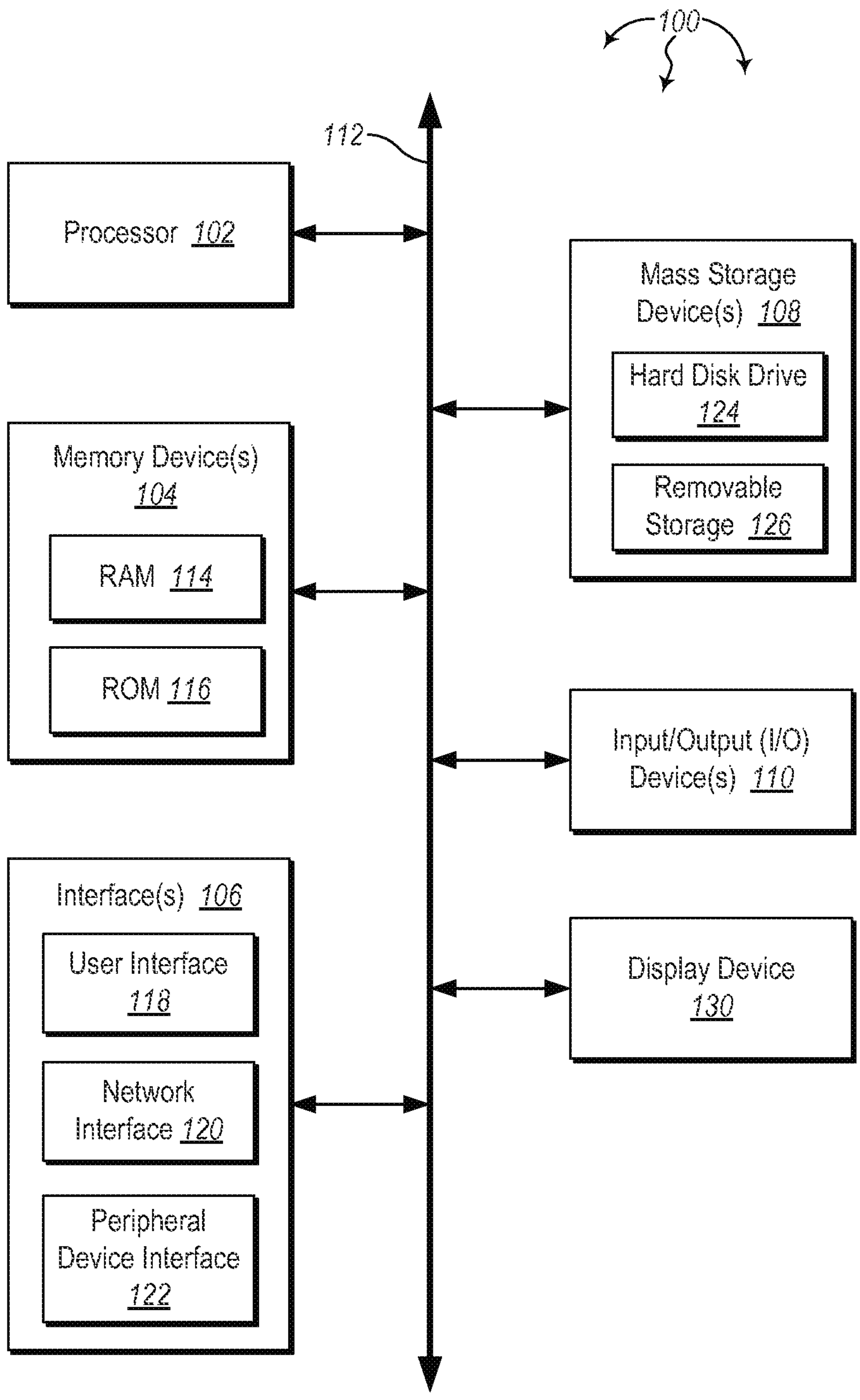
FIG. 1 illustrates an example block diagram of a computing device.

The present invention extends to methods, systems, and computer program products for an integrated loyalty program and game mechanic. In the following description of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

It is further noted that, where feasible, functions described herein can be performed in one or more of: hardware, software, firmware, digital components, or analog components. For example, one or more application specific integrated circuits ("ASICs") can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

In general, embodiments of the invention are directed to an integrated loyalty program and game mechanic. When a customer makes a purchase of physical products from a merchant, membership in the merchant's loyalty program can be rewarded with a digital (virtual) asset for use in a computer game. The merchant can also advertise digital assets as loyalty program rewards in the game to persuade customers to purchase physical products from the merchant.

In one aspect, the computer game is maintained by the merchant. In another aspect, the merchant enters into a partnership with an owner of a third party computer game.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory ("RAM") 114) and/or nonvolatile memory (e.g., read-only memory ("ROM") 116). Memory device(s) 104 may also include rewritable ROM, such as Flash memory.

Mass storage device(s) 108 include various computer readable media, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 can include any number of different network interfaces 120, such as interfaces to personal area networks ("PANs"), local area networks ("LANs"), wide area networks ("WANs"), wireless networks (e.g., near field communication ("NFC"), Bluetooth, Wi-Fi, etc. networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
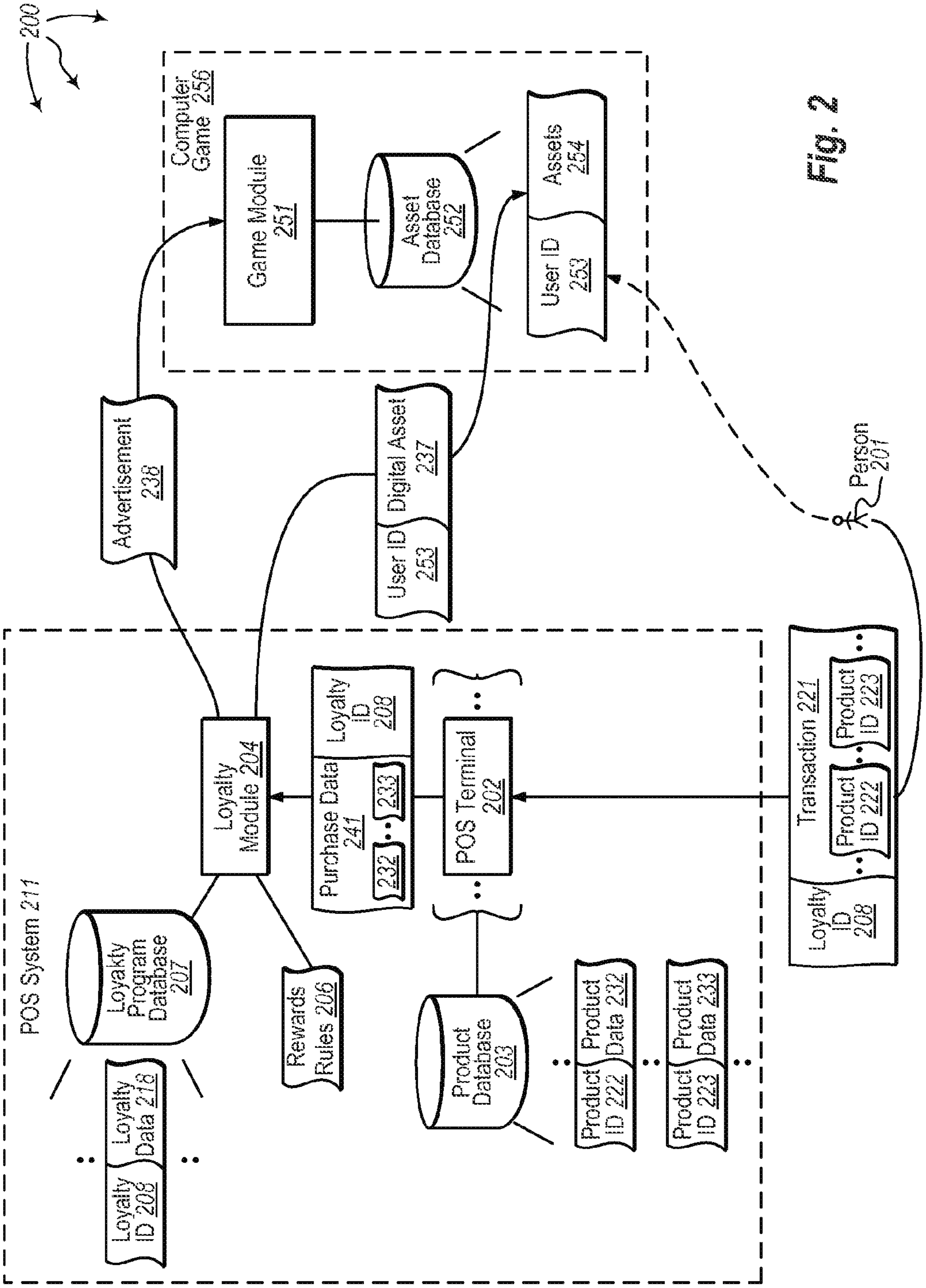
FIG. 2 illustrates an example computer architecture of an integrated loyalty program and game mechanic.

FIG. 2 illustrates an example computer architecture 200 of an integrated loyalty program and game mechanic. Referring to FIG. 2, computer architecture 200 includes Point-Of-Sale (POS) system 211 and computer game 256. Each of the depicted components can be connected to one another over (or be part of) a network, such as, for example, a PAN, a LAN, a WAN, and even the Internet. Accordingly, each of the depicted components as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Point-Of-Sale (POS) system 211 can be a POS system for merchant 217. Point-Of-Sale (POS) system 211 includes product database 203, loyalty module 204, reward rules 206, loyalty program database 207, and one or more POS terminals including POS terminal 202. POS terminals in POS system 211 can be located in a variety of different geographic locations. Some POS terminals can be in the same store location. Other POS terminals can be in different store locations. The POS terminals can be distributed across different cities, states and countries.

In general, a POS terminal can include a transaction processor, a communication module, and I/O peripherals. Generally, a transaction processor is configured to manage sales transactions for a POS terminal. A transaction processor can receive input from I/O peripherals to open a sales transaction, collect receipt data (e.g., date, time, item, number of units, cost data, tax, department, payment method, etc.) for a sales transaction, and close a sales transaction. Item data for an item (e.g. item description, item cost, department, etc.) can be retrieved from an item database in response to scanning a barcode on (or otherwise identifying) the item. For example, a barcode scanner in I/O peripherals can be used to a product barcode. From the scan, a POS terminal can derive barcode data used to obtain other item data. Barcode data obtained from scanning an item barcode can be linked to other item data within an item database. Barcode data can also be retained within item data for inclusion in a digital receipt.

Further item data for an item (e.g., number of units, tax, payment method, etc.) can be determined by the transaction processor. Item data for one or more items can be combined with other data (e.g., coupons, surveys, etc.) to form digital receipt data for a transaction.

I/O peripherals can include one or more of: a monitor (e.g., a cashier-facing monitor), one or more input devices (e.g., barcode scanners, keyboards, scales, or the like), one or more payment devices (e.g., cash drawers, card readers, etc.) for receiving or returning payments, and one or more output devices (e.g., customer-facing display or monitor, receipt printer, etc.).

A communication module can be a wired and/or wireless network adapter for connecting a POS terminal with a network, such as, for example, a Wi-Fi and/or wired Ethernet network, that facilitates a further connection to a network (e.g., the Internet).

A POS terminal can be at a physical store location along with additional POS terminals including similar components. The physical store location may be owned by an entity, such as, for example, a retailer corporation (or merchant) that runs a chain of stores. The chain of stores can include one or more of: grocery stores, department stores, warehouse stores, discount stores, etc. In some aspects, POS system 211 includes components in a checkout isle as well as components in a store based data center. Other POS systems, also including similar components, can be at other physical store locations owned by the entity.

Product database 203 includes product IDs and corresponding product data, such as, for example, images, descriptions, bar code data, price, etc., for a product. A POS terminal (e.g., POS terminal 202) can refer to product database 203 to match a product ID to corresponding product data for a product.

Loyalty module 204 is configured to determine when a customer is to receive a loyalty reward and what loyalty reward as customer is to receive. Loyalty program database 207 includes loyalty IDs and corresponding loyalty data for customers. Loyalty data can include customer purchase history data, indications of previously granted rewards, indications of premium memberships and/or status levels, customer demographic information, categories of interest, customer preferences, game user IDs, etc. Loyalty module 204 can receive purchase data for customer transactions. The purchase data can identify products purchased by a customer, prices paid for the products, if coupons were used, if promotions we applied, etc. Upon receiving purchase data for a customer transaction, loyalty module 204 can apply reward rules 206 to loyalty data for the customer and/or to the purchase data to determine if a reward is appropriate. The merchant can modify reward rules 206 from time to time to reflect promotions or other offers (e.g., associated with advertisements in computer games). When a reward is apocopate, a granted reward may be the same for all customers. On the other hand, when a reward is appropriate, a granted reward can vary based on loyalty data for a customer. For example, rewards can be varied based on customer demographic information or customer preferences.

In one aspect, a reward is a digital asset for use in a computer game. The digital asset is granted to the customer by sending the digital asset to the game for inclusion in the customer's game assets. The customer can then interact with the digital asset in the computer game.

Loyalty module 204 can also send advertisements to the computer game for presentation in a game module. An advertisement can be presented to loyalty program members or to all users of the game. Advertisements can be used to entice game users to purchase physical products from a merchant, join the merchant's loyalty program, etc. For example, an advertisement can indicate that if a game user purchases a specified physical product or products form the merchant, the game user will receive a digital game asset as a reward.

Figure 3:
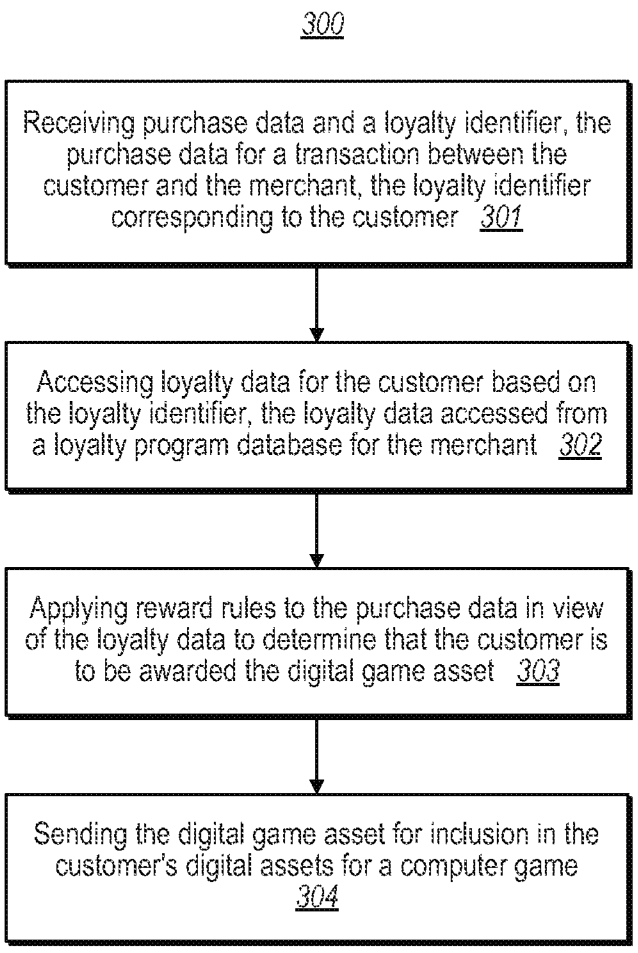
FIG. 3 illustrates a flow chart of an example method for providing a digital game asset as a loyalty program reward.

FIG. 3 illustrates a flow chart of an example method 300 for providing a digital game asset as a loyalty program reward. Method 300 will be described with respect to the components and data in computer architecture 200.

Person 201 can be both a loyalty program member for merchant 217 and also a user of computer game 256. Person 201 can participate in transaction 221 POS terminal 202 to purchase products having product IDs 222, 223, etc. from merchant 217. Person 201 can also indicate loyalty ID 208 to POS terminal 202, either manually (e.g., swiping a card) or in an automated fashion through use of a mobile device, at the time of transaction 221.

POS terminal 202 can refer to product database 203 to access product data 232, 233, etc. corresponding to product IDs 222, 223, etc. POS terminal 202 can used product data 232, 233, etc. (e.g., product prices) to process transaction 221. POS terminal can formulate a digital receipt for transition 221. The digital receipt can be delivered to person 201 electronically and/or stored at a receipt server for subsequent access.

POS terminal 202 can also send purchase data 241, including product data 232 and 233, to loyalty module. In aspect, purchase data 241 is similar to data contained in the formulated digital receipt. Purchase data 241 can also contain other or different data relevant to making a reward determination.

Method 300 includes receiving purchase data and a loyalty identifier, the purchase data for a transaction between the customer and the merchant, the loyalty identifier corresponding to the customer (301). For example, loyalty module 204 can receive purchase data 241, including product data 232 and 233, and loyalty ID 208 from POS terminal 202. Purchase data 241 corresponds to transaction 221 and loyalty ID 208 corresponds to person 201.

Method 300 includes accessing loyalty data for the customer based on the loyalty identifier, the loyalty data accessed from a loyalty program database for the merchant (302). For example, loyalty module 204 can access loyalty data 218 (for person 201) from loyalty program database 202 based on loyalty ID 208. Loyalty data 218 can include user ID 253 (person 201's user ID in computer game 256).

Method 300 includes applying reward rules to the purchase data in view of the loyalty data to determine that the customer is to be awarded the digital game asset (303). For example, loyalty module 204 can apply reward rules 206 to purchase data 241 in view of loyalty data 218 to determine that person 201 is to be awarded digital asset 237. Loyalty module 204 can also update loyalty data 218 to represent that digital asset 237 was awarded to person 201.

Method 300 includes sending the digital game asset for inclusion in the customer's digital assets for a computer game (304). For example, loyalty module 204 can associate user ID 253 with digital asset 237. Loyalty module 204 send digital asset 237 along with user ID 253 to computer game 256.

Game module 251 can maintain asset database 252 for computer game 256. Asset database 252 includes user IDs and corresponding assets. User ID 253 and corresponding assets 254 can belong to person 201. Computer game 256 can receive digital asset 237 along with user ID 253 from loyalty module 204. Based on user ID 253, game module 251 can stored digital asset 237 in assets 254. When person 201 subsequently accesses computer game 256, digital asset 237 can be available to person 201.

Loyalty module 204 can also send advertisement 238 to computer game 256. Game module 256 can receive advertisement 238 and display advertisement 238 to users within computer game 256. Advertisement 238 can entice users to purchase physical products from merchant 217. Advertisement 238 can also include a promotion having digital game asset as a reward. For example, advertisement 238 can indicate that any customers buying two gallons of milk are to receive a new cow in computer game 256.

Loyalty module 204 can also promote ongoing interaction with and/or purchases from merchant 217 to receive additional digital game assets. For example, an awarded digital asset may degrade over time within computer game 256. Additional digital assets can be used to transition the awarded digital asset back to an undegraded state. For example, over time the awarded cow can become hungry and subsequently unhealthy in computer game 256 when it is not fed. Purchasing a specified quantity of oats from merchant 217 can cause loyalty module 204 to award a digital asset in the form of cow food in computer game 256. As such, customers may be more motivated to buy the specified quantity of oats.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. At a Point-Of-Sale (POS) computer system for a merchant, the computer system having a processor and system memory, a method for awarding a digital game asset to a customer as a loyalty program reward, the method comprising:

receiving, by a POS computer system, purchase data and a loyalty identifier, the purchase data for a transaction between the customer and the merchant, the loyalty identifier corresponding to the customer;

accessing, by the POS computer system, loyalty data for the customer based on the loyalty identifier, the loyalty data accessed from a loyalty program database for the merchant, wherein the loyalty data includes a user ID of the customer for a computer game;

correlating, by the POS computer system, the loyalty identifier with the user ID;

applying, by the POS computer system, reward rules to the purchase data in view of the loyalty data to determine that the customer is to be awarded the digital game asset; and sending, by the POS computer system, the digital game asset and the user ID to a game module associated with the computer game for inclusion in the customer's digital assets for the computer game.

2. The method of claim 1, wherein accessing loyalty data for the customer based on the loyalty identifier comprises accessing one or more of: customer purchase history data, indications of previously granted rewards, indications of premium memberships and/or status levels, customer demographic information, categories of interest, or customer preferences, for the customer.

3. The method of claim 1, wherein accessing loyalty data for the customer based on the loyalty identifier comprises accessing the customer's user ID for the computer game.

4. The method of claim 1, wherein applying reward rules to the purchase data in view of the loyalty data to determine that the customer is to be awarded the digital game asset comprises awarding a digital game asset in accordance with a promotion of the merchant.

5. The method of claim 1, wherein applying reward rules to the purchase data in view of the loyalty data to determine that the customer is to be awarded the digital game asset comprises selecting the digital game asset as an award from among a plurality of different possible rewards based on customer preferences.

6. At a Point-Of-Sale (POS) computer system for a merchant, the computer system having a processor and system memory, a method for awarding a digital game asset to a customer as a loyalty program reward, the method comprising:

receiving purchase data and a loyalty identifier, the purchase data for a transaction between the customer and the merchant, the loyalty identifier corresponding to the customer;

accessing loyalty data for the customer based on the loyalty identifier, the loyalty data accessed from a loyalty program database for the merchant;

applying reward rules to the purchase data in view of the loyalty data to determine that the customer is to be awarded the digital game asset, the digital game asset configured to degrade over time in the computer game; and sending the digital game asset for inclusion in the customer's digital assets for a computer game.

7. The method of claim 1, further comprising sending an advertisement to the computer game to advertise another digital asset as a reward for a specified purchase from the merchant.

8. A computer program product for use at a Point-Of-Sale (POS) computer system for a merchant, the computer program product for implementing a method for awarding a digital game asset to a customer as a loyalty program reward, the computer program product comprising one or more computer storage devices having stored thereon computer-executable instructions that, when executed at a processor, cause the Point-Of-Sale (POS) computer system perform the method, including the following:

receive, by the POS computer system, purchase data and a loyalty identifier, the purchase data for a transaction between the customer and the merchant, the loyalty identifier corresponding to the customer;

access, by the POS computer system, loyalty data for the customer based on the loyalty identifier, the loyalty data accessed from a loyalty program database for the merchant, wherein the loyalty data includes a user ID of the customer for a computer game;

correlating, by the POS computer system, the loyalty identifier with the user ID;

apply, by the POS computer system, reward rules to the purchase data in view of the loyalty data to determine that the customer is to be awarded the digital game asset; and send, by the POS computer system, the digital game asset and the user ID to a game module associated with the computer game for inclusion in the customer's digital assets for the computer game.

9. The computer program product of claim 8, wherein computer-executable instructions that, when executed, cause the Point-Of-Sale (POS) computer system to access loyalty data for the customer based on the loyalty identifier comprise computer-executable instructions that, when executed, cause the Point-Of-Sale (POS) computer system to access one or more of: customer purchase history data, indications of previously granted rewards, indications of premium memberships and/or status levels, customer demographic information, categories of interest, or customer preferences, for the customer.

10. The computer program product of claim 8, wherein computer-executable instructions that, when executed, cause the Point-Of-Sale (POS) computer system to access loyalty data for the customer based on the loyalty identifier comprise computer-executable instructions that, when executed, cause the Point-Of-Sale (POS) computer system to access the customer's user ID for the computer game.

11. The computer program product of claim 8, wherein computer-executable instructions that, when executed, cause the Point-Of-Sale (POS) computer system to apply reward rules to the purchase data in view of the loyalty data to determine that the customer is to be awarded the digital game asset comprise computer-executable instructions that, when executed, cause the Point-Of-Sale (POS) computer system to award a digital game asset in accordance with a promotion of the merchant.

12. The computer program product of claim 8, wherein computer-executable instructions that, when executed, cause the Point-Of-Sale (POS) computer system to apply reward rules to the purchase data in view of the loyalty data to determine that the customer is to be awarded the digital game asset comprise computer-executable instructions that, when executed, cause the Point-Of-Sale (POS) computer system to select the digital game asset as an award from among a plurality of different possible rewards based on customer preferences.

13. A computer program product for use at a Point-Of-Sale (POS) computer system for a merchant, the computer program product for implementing a method for awarding a digital game asset to a customer as a loyalty program reward, the computer program product comprising one or more computer storage devices having stored thereon computer-executable instructions that, when executed at a processor, cause the Point-Of-Sale (POS) computer system perform the method, including the following:

receive purchase data and a loyalty identifier, the purchase data for a transaction between the customer and the merchant, the loyalty identifier corresponding to the customer;

access loyalty data for the customer based on the loyalty identifier, the loyalty data accessed from a loyalty program database for the merchant;

apply reward rules to the purchase data in view of the loyalty data to determine that the customer is to be awarded the digital game asset, the digital game asset configured to degrade over time in the computer game; and send the digital game asset for inclusion in the customer's digital assets for a computer game.

14. The computer program product of claim 8, further comprising computer-executable instructions that, when executed, cause the Point-Of-Sale (POS) computer system to send an advertisement to the computer game to advertise another digital asset as a reward for a specified purchase from the merchant.

15. A computer system for a merchant, the computer system comprising:

one or more processors;

system memory;

one or more computer storage devices having stored thereon computer-executable instructions representing a loyalty module, the loyalty module configured to:

receive purchase data and a loyalty identifier, the purchase data for a transaction between a customer and the merchant, the loyalty identifier corresponding to the customer;

access loyalty data for the customer based on the loyalty identifier, the loyalty data accessed from a loyalty program database for the merchant, wherein the loyalty data includes a user ID of the customer for a computer game;

correlate the loyalty identifier with the user ID;

apply reward rules to the purchase data in view of the loyalty data to determine that the customer is to be awarded the digital game asset; and send the digital game asset and the user ID to a game module associated with the computer game for inclusion in the customer's digital assets for the computer game.

16. The computer system of claim 15, wherein the loyalty module being configured to access loyalty data for the customer based on the loyalty identifier comprises the loyalty module being configured to access one or more of:

customer purchase history data, indications of previously granted rewards, indications of premium memberships and/or status levels, customer demographic information, categories of interest, or customer preferences, for the customer.

17. The computer system of claim 15, wherein the loyalty module being configured to access loyalty data for the customer based on the loyalty identifier comprises the loyalty module being configured to access the customer's user ID for the computer game.

18. The computer system of claim 15, wherein the loyalty module being configured to apply reward rules to the purchase data in view of the loyalty data to determine that the customer is to be awarded the digital game asset comprises the loyalty module being configured to award a digital game asset in accordance with a promotion of the merchant.

19. A computer system for a merchant, the computer system comprising:

one or more processors;

system memory;

one or more computer storage devices having stored thereon computer-executable instructions representing a loyalty module, the loyalty module configured to:

receive purchase data and a loyalty identifier, the purchase data for a transaction between a customer and the merchant, the loyalty identifier corresponding to the customer;

access loyalty data for the customer based on the loyalty identifier, the loyalty data accessed from a loyalty program database for the merchant;

apply reward rules to the purchase data in view of the loyalty data to determine that the customer is to be awarded the digital game asset, the digital game asset configured to degrade over time in the computer game; and send the digital game asset for inclusion in the customer's digital assets for a computer game.

20. The computer system of claim 15, wherein the loyalty module is further configured to send an advertisement to the computer game to advertise another digital asset as a reward for a specified purchase from the merchant.

* * * * *